US008794599B2

(12) United States Patent
Steiner

(10) Patent No.: US 8,794,599 B2
(45) Date of Patent: Aug. 5, 2014

(54) MANUAL MISTING FAN

(76) Inventor: Greg Steiner, Naperville, IL (US)

(*) Notice: Subject to any disclaimer, the term of this patent is extended or adjusted under 35 U.S.C. 154(b) by 755 days.

(21) Appl. No.: 13/066,534

(22) Filed: Apr. 18, 2011

(65) Prior Publication Data

US 2012/0261842 A1     Oct. 18, 2012

(51) Int. Cl.
*B01F 3/04* (2006.01)
*F24F 6/14* (2006.01)
*B05B 11/00* (2006.01)
*B05B 9/08* (2006.01)

(52) U.S. Cl.
CPC ............... *F24F 6/14* (2013.01); *F24F 2221/38* (2013.01); *Y02B 30/545* (2013.01); *B05B 11/30* (2013.01); *B05B 9/0816* (2013.01); *F24F 2221/12* (2013.01); *Y10S 261/43* (2013.01)
USPC ................. 261/28; 261/78.2; 261/DIG. 43; 239/289

(58) Field of Classification Search
USPC ................. 261/28, 34.1, 78.2, 115, DIG. 3, 261/DIG. 43; 239/289
See application file for complete search history.

(56) References Cited

U.S. PATENT DOCUMENTS

| | | | | |
|---|---|---|---|---|
| 5,843,344 A | * | 12/1998 | Junkel et al. | 261/28 |
| 6,378,845 B1 | * | 4/2002 | Hsu | 261/28 |
| 6,886,759 B1 | * | 5/2005 | Okronick et al. | 239/289 |
| 7,878,424 B2 | * | 2/2011 | Schnuckle | 239/289 |

FOREIGN PATENT DOCUMENTS

JP     2013-22435 A  *  2/2013

* cited by examiner

*Primary Examiner* — Charles Bushey
(74) *Attorney, Agent, or Firm* — Knechtel, Demeur & Samlan

(57) ABSTRACT

There is disclosed a non-electric portable manually operated misting fan assembly which is formed by a handle for allowing the user to grasp and manipulate the fan assembly, the handle formed by a container adapted to function as a reservoir for a supply of fluid and having an upper end which includes a pump assembly including a pump head extending upwardly therefrom for pumping fluid from the handle container through a fluid nozzle located in the pump head. The fan means are fixedly mounted on the handle and positioned above the pump head, the fan means bounded by an upper end and a lower end, the lower end being accurately formed over the pump head in order to allow the user to position his finger on the pump head to manipulate the pump in order to eject a fluid from the fluid reservoir incident to the fanning procedure.

13 Claims, 5 Drawing Sheets

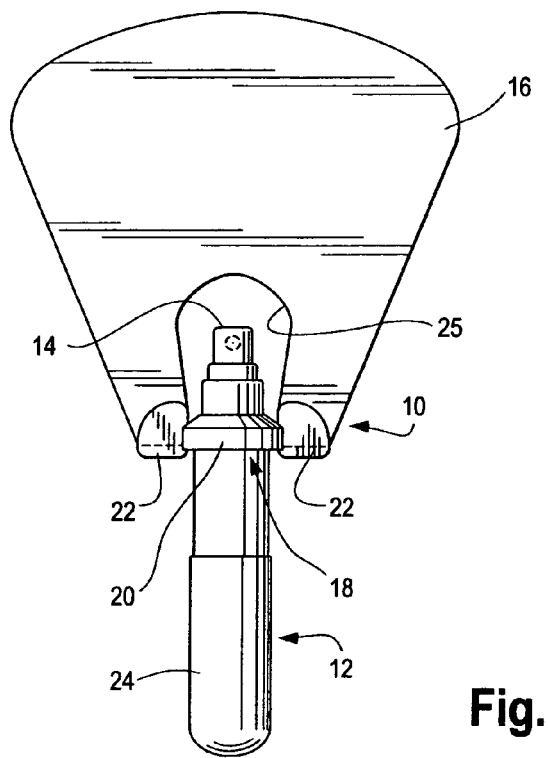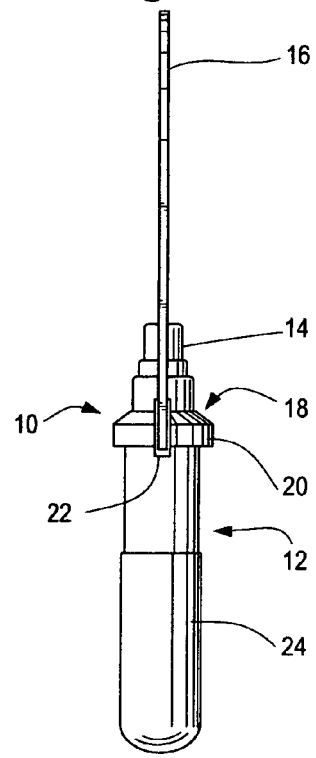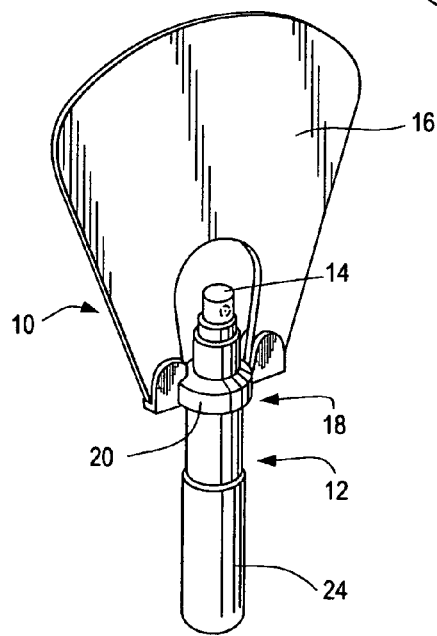

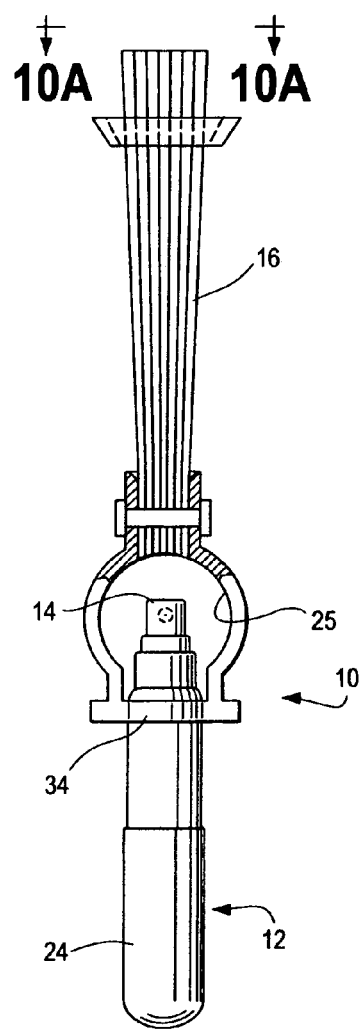
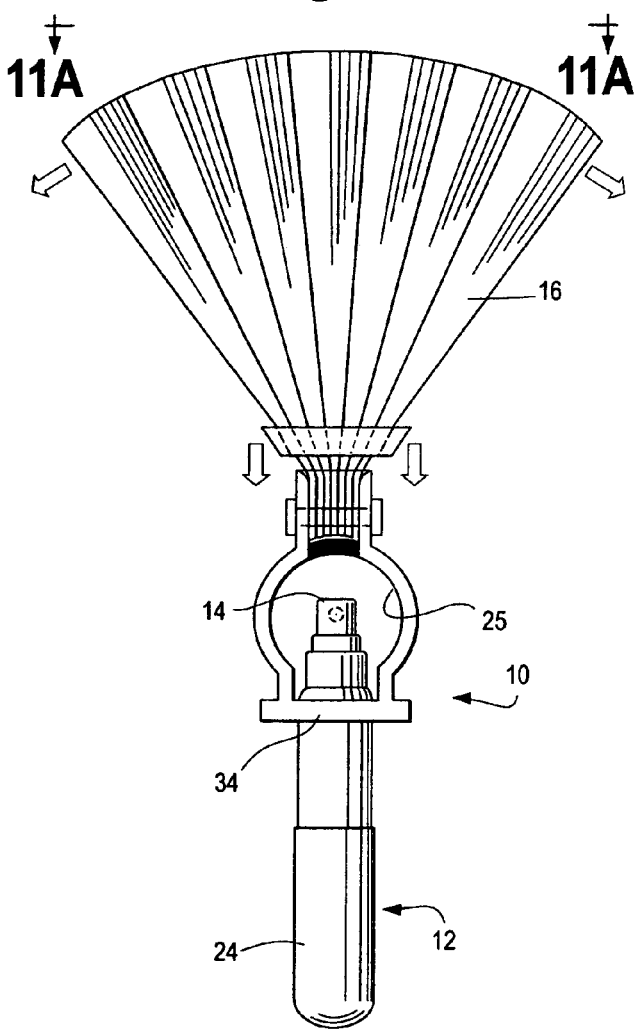

MANUAL MISTING FAN

BACKGROUND TO THE INVENTION

The present invention deals with a non-electric portable misting fan assembly which permits the user to create a cooling breeze. The advantage of the present invention is the fact that the device requires no source of power and is manually operated by the user thereby eliminating batteries and simplifying the device.

Misting fans have become quite well known in the prior art. Any number of constructions of misting fans have been developed which allows a user to utilize a portable air conditioning system when involved in various types of activities. These types of misting fans are shown in any number of prior patents including U.S. Pat. No. 5,338,495 directed to a portable misting fan formed by a fluid container, and an upper head portion which includes a motorized fan, and a pump assembly for permitting the user to pump a fluid mist from the fluid reservoir up into the upper head portion, thereby ejecting a fluid mist therefrom while simultaneously operating the fan by actuating the switch in order to commence the operation of the fan. The effect is to provide a cooling mist for the user.

Various other prior art references show similar types of structures, including U.S. Pat. No. 6,398,132 which is directed to another variation of a similar portable misting device showing a fan driven misting device operated by a power source such as batteries. Another variation is shown in U.S. Pat. No. 7,143,958 which is again directed to a device having a fan assembly mounted on the top of the fluid reservoir, the fan being motorized in that it is driven by batteries, so that the user may eject a fluid mist by a pump assembly, while simultaneously operating the motor driven fan to cool one's body. The device shown in the subject patent also includes a straw which allows the user to sip fluid from the reservoir as well. Another variation is shown in a handle mist sprayer in U.S. Pat. No. 6,827,290. The device shown is an alternate form which permits the user to grasp a handle along the side of the device, with the motorized fan being driven in the front portion thereof, which may be used for either disseminating a fluid mist, or for cooling purposes. Similar comments are applicable with respect to U.S. Pat. No. 5,752,662 which illustrates still another variation of a fluid misting fan or atomizer wherein the fluid which is pumped from the reservoir is pumped in a path of travel transverse to the fan blades. Design patent D503212 shows another alternate form of a water misting spray fan wherein the fluid which is pumped from the reservoir is pumped above the fan blades for cooling purposes.

It will be evident from a review of the prior art that virtually all of these devices include a motor driven fan assembly which requires the use of batteries in order to operate the device. Further, since the fan is motor driven a motor must be provided in the head unit in order to drive the fan, and the batteries must be provided in a battery compartment in order to provide a power source for the motor driven fan. All of these elements add weight and render these devices somewhat cumbersome in order to utilize the same.

The prior art has made an attempt to simply the device by eliminating the motor driven fan and the batteries, to create a manually operated portable misting fan. The device illustrated in patent publication 2010/0,123,023 illustrates a personal misting device which includes a manually operated and retractable folding fan. In this device, a fluid reservoir is provided which functions as a handle, and includes a fan which is mounted horizontally relative to the handle reservoir. The folding fan is pivotally mounted onto the container and includes a trigger for opening the fan to its fully opened position and alternatively, causes the fan to fold down upon itself and be stored adjacent to and in horizontal alignment with the handle reservoir. The device illustrated in the prior art requires numerous parts in order to construct the same, requiring the fan be mounted to some form of a bracket, in pivotal relationship thereto, and also requires an arm connected to the fan to alternately open and retract the fan between its open position and its closed position. This adds to the cost of manufacturing and renders the device somewhat cumbersome.

OBJECTS AND ADVANTAGES

The object of the present invention is to provide a simplified manually operated non-electric portable misting fan assembly which minimizes the number of moving parts, while still operating efficiently while providing a cooling misting fan device. Hence, the primary object of the present invention is to provide a non-electric portable manually operated misting fan assembly which includes a handle for allowing the user to grasp and manipulate the fan assembly to create a cooling breeze, the handle being formed by a container adapted to function as a fluid reservoir. The handle includes a pump assembly associated therewith for pumping fluid from the handle reservoir by the push pump head extending upwardly from the container, the fluid mist being ejected through a fluid nozzle located in the pump head. The fan means are fixedly mounted on the handle and positioned above the pump head, the fan means including a lower end which is arcuately formed over the pump head thereby to allow the user to place a finger under the fan and over the pump head in order to manipulate the pump head to eject the fluid from the handle container.

A further object of the present invention is to provide a fan assembly of the type described wherein the handle container includes mount means interposed between the fan and the handle container for positionally mounting the fan adjacent to and above the pump head such that the user may grasp and manipulate the fan while simultaneously allowing the operation of the pump head to pump a fluid mist from the handle container through the fluid nozzle.

A further object of the present invention is to provide a fan assembly of the type described wherein the fan may consist of a foldable fan construction which is mounted above the handle container and is mounted to the handle container in a manner which permits the fan to be alternately opened and closed.

In conjunction with the foregoing object, it is a further object of the present invention to provide a fan assembly of the type described wherein the foldable fan may have mount legs which cooperate with mount means carried by the handle container, such that the fan when in use, may be mounted by inserting the mount legs onto the handle container in order to provide a usable device, and alternately be removed from the handle container when storing the same.

A further object of the present invention is to provide a simplified non-electric portable misting fan assembly which includes a foldable fan mounted on top of a handle container, which is mounted onto a bracket carried by the handle container, and positionally mounted above the pump head, the fan being foldable, and including a lock ring which may be movable between a lower fan open position and an upper fan closed position such that the device may be folded for easy storage and quickly unlocked for its use position.

SUMMARY OF THE INVENTION

In summary, the present invention provides a non-electric portably manually operated misting fan assembly which includes two basic elements. The first element consisting of a handle which functions as a container for a supply of fluid, and a second element which consists of a fan mounted above the handle, and positioned such that the operator may manipulate the pump assembly of the handle container, while simultaneously cycling the fan back and forth to provide a cooling breeze.

The present invention simplifies the fan assembly by minimizing the number of moving parts while still providing a device which will operate quite efficiently for providing a portable cooling device.

BRIEF DESCRIPTION OF THE DRAWINGS

The present invention would be better understood by reference to the following specification taken in conjunction with the following drawings:

FIG. 1 is a front elevational view showing a fan assembly of the present invention including the handle container, and a fan blade mounted above the handle;

FIG. 2 is a perspective view of the fan assembly as shown in FIG. 1;

FIG. 3 is a side elevational view showing the fan assembly of FIG. 1;

FIG. 10 is a front elevational view showing another alternate form of the fan assembly of the present invention wherein the fan consists of a foldable fan mounted to a bracket which is positioned on the handle container holding the fan vertically above the handle container and providing a spacing above the pump head to allow the operator to manipulate the pump head;

FIG. 10a is a cross sectional view taken along the line 10a-10a of FIG. 10 showing the fan in the closed position and the lock ring slidably moved upward to maintain the fan in the closed position;

FIG. 11 is a front elevational view of the fan assembly of FIG. 10 showing the fan in the open position with the lock ring slided downward so that the foldable fan is in the open position;

FIG. 11a is a side cross sectional view taken the line 11a-11a of FIG. 11 showing the foldable fan in its open position.

DETAILED DESCRIPTION OF DRAWINGS

Figure 4:
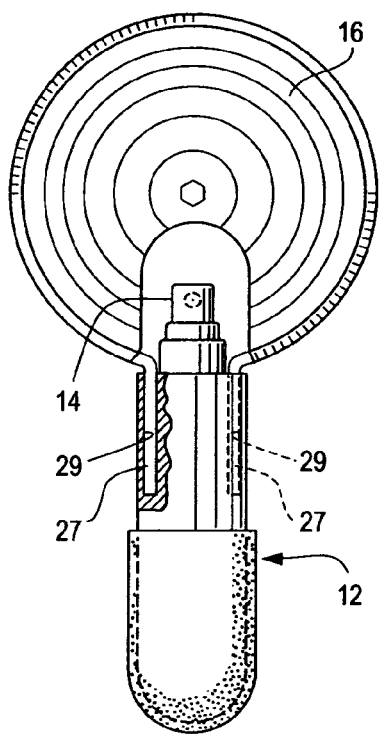
FIG. 4 is a front elevational view of an alternate embodiment of the fan assembly wherein the fan blade includes a pair of mount legs which cooperate with a pair of mount slots located in the handle container, such that the fan may be alternately mounted to and removed from the handle for storage purposes.

The various figures show various alternate embodiments of the fan assembly of the present invention. FIGS. 1-3 show one variation wherein the fan assembly 10 is formed by an elongate handle container 12 which functions as a reservoir for a supply of fluid. The elongate handle container includes a pump assembly 14 which functions to pump a supply of fluid from the handle container 12 through a pump head 16 via a fluid nozzle 18. The handle container 12 is provided with a collar 20 which fits over and around the handle container 12. Collar 20 includes a pair of opposed mount flanges 22 to which the fan blade 24 is mounted. The fan blade 24 includes an upper end 25 and a lower end 26. The lower end 26 includes arcuate cut out 28 which provides a space for the operator's index finger to be inserted there through in, order to operate the pump head 16.

The collar 20 may be mounted to the handle container 12 in a removable fashion by simply press fitting it over the handle container 12. Alternatively, the collar 20 may be fixedly secured to the handle container 12.

As a further refinement of the fan assembly of the present invention, the handle container 12 may include a manually operated atomizer represented by the numeral 29 which may be manipulated by the operator by pumping the atomizer 29 in an up and down fashion in order to atomize the fluid contained within the handle container 12.

Figure 5:
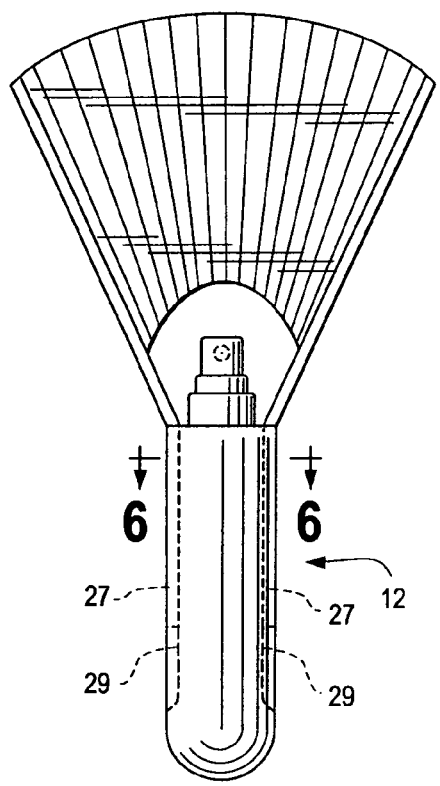
FIG. 5 is a front elevational view of an alternate form of a fan assembly according to the present invention showing the fan being a foldable fan assembly, including a pair of mount legs which cooperate with a pair of slots located in the handle container such that the fan may be removed from the handle container by removing the mount legs from the mount slots of the handle container for storage, and inserting the same when the device is use.
Figure 6:
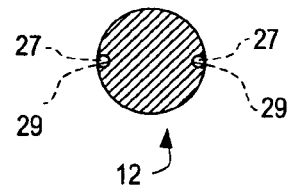
FIG. 6 is a cross sectional view taken along the line 6-6 of FIG. 5, showing the relationship between the mount legs of the fan assembly, and the mount slots located in the handle container.

FIGS. 4, 5 and 6 represent still further alternative embodiments of the present invention. For ease of description, like parts will be denoted with the same numerals as previously described. In FIG. 4, the fan assembly 10 is formed by the handle container 12, to which the fan assembly is mounted. In this embodiment, the fan assembly is formed by a fan blade 24 and assumes a circular configuration. The fan blade 24 is carried within the confines of a circular rim 31 which terminates in a pair of opposed mount legs 32. The handle container 12 includes a pair of opposed mount slots 34 and as will be clear from a view of FIG. 4, the fan assembly is mounted to the handle container by inserting the mount legs 32 into the mount slots 34. The mount legs 32 may be constructed to be removable from the mount slots 34 for ease of storage, whereby the user may mount the fan assembly to the handle container 12 by inserting the mount legs into the mount slots to use the device, and alternatively, remove the fan blade 24 from the handle container 12 when storing the device.

FIG. 5 shows an alternative embodiment relative to FIG. 4 where again like parts are labeled with similar numerals. In this embodiment, there is shown a handle container 12 which includes a pump assembly 14, pump head 16 and fluid nozzle 18. The handle container 12 also includes a pair of opposed mount slots 34 which function to receive the mount legs 32 of the fan 24. In this embodiment, the fan 24 may be made as a foldable fan and bounded by a pair of opposed side supports 36. The side supports terminate in a pair of opposed mount legs 32 as previously shown with respect to FIG. 4. The advantage of this embodiment is that the user may remove the fan blade 24 by removing the mount legs 32 from the mount slots 34, and then folding the fan for ease of storage. The fan blade 24 is formed as an articulated construction, and also includes the arcuate cut out 28 positioned vertically above the pump head in order to provide the operator access to the pump head 16. FIG. 6 illustrates the relationship between the mount legs 32 and the mount slots 34 in order to mount the fan blade 24 to the pump handle 12.

Figure 7:
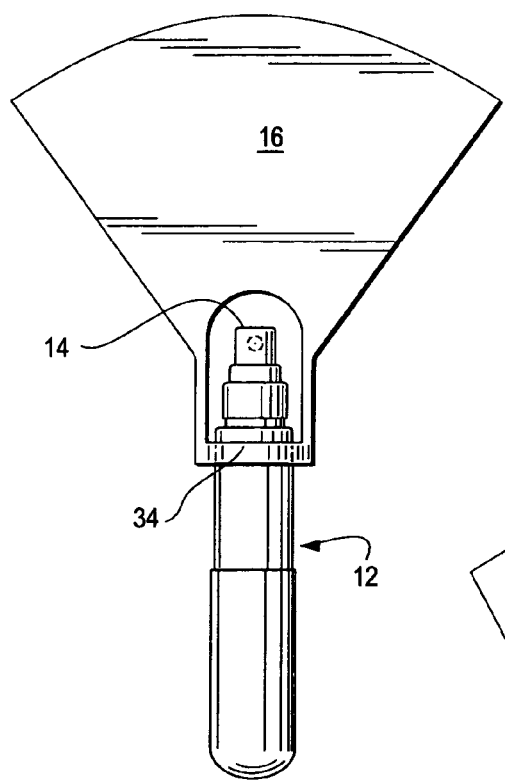
FIG. 7 is an alternate embodiment of the fan assembly of the present invention wherein the fan blade assumes a more arcuate configuration, and the bracket for mounting the fan to the handle container formed as a part of the fan assembly.
Figure 8:
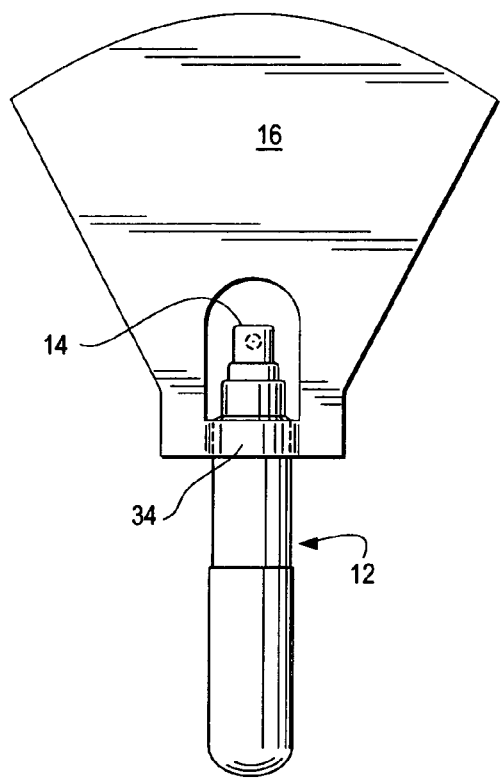
FIG. 8 shows a further alternate embodiment of the fan assembly of the present invention with the legs for mounting the fan assembly to the handle container are of thicker material for greater support of the fan mounted on the handle container.

FIGS. 7 and 8 illustrate a further embodiment of the fan assembly of the present invention. In these embodiments, the particular construction of the fan blade 24 relative to the collar 20 is illustrated. In FIG. 7 for example, the fan blade 24 may be made coextensive with the collar 20 such that the entire fan assembly consisting of the fan blade 24 and the collar 20 may simply be slidably mounted onto the handle container 12 and may be friction fitted thereon, or may be fixedly secured thereto. In FIG. 7, the opposed fan blade legs 38 may assume a more narrow construction, as an economical manufacturing method for minimizing the amount of material utilized in creating the fan assembly. In FIG. 8, it will be appreciated that the fan blade legs 34 have a thicker construction, in order to afford more support for the fan blade 24. With respect to both embodiments as shown in FIGS. 7 and 8, the lower end of the fan blade 24 includes the arcuate cut out 28 in order to accommodate a space for the user to insert their index finger for the purpose of manipulating the thumb pad 16.

Figure 9:
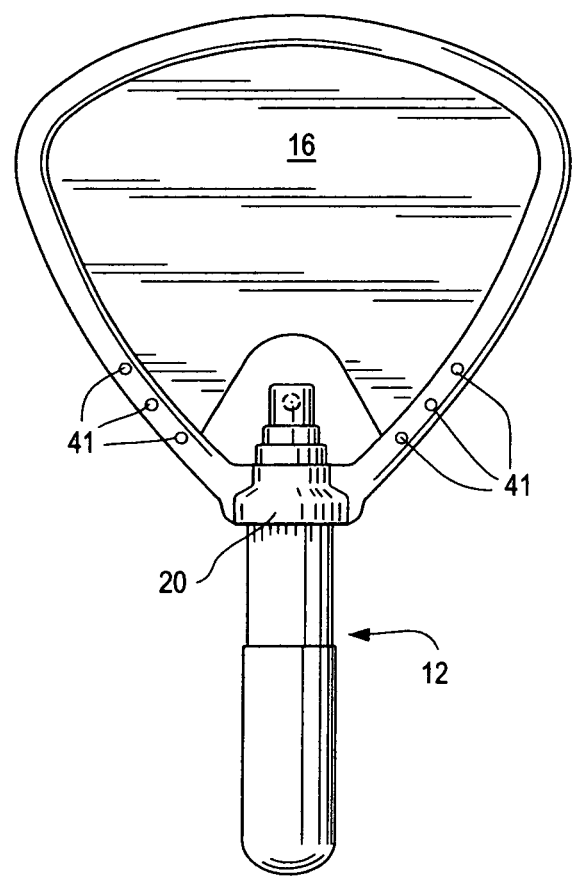
FIG. 9 is a front elevational view showing still an alternate of the fan assembly of the present invention where the fan blade is contained within a surrounding guide and riveted thereto for additional support of the fan contained within the fan bracket.

FIG. 9 illustrates still an alternate embodiment simply to illustrate the manner in which the fan assembly may be constructed. In this variation, the handle container 12 carries the fan assembly including the fan blade 24, and a blade support rim 41. The fan blade 24 may be mounted to the rim 41 by any appropriate means such as rivets as shown in FIG. 9. It will be noted that there are several rivets 43 which are inserted through the blade support rim 41 and the fan blade 24 in order to mount the fan blade 24 therein. Once again, the fan blade 24 includes the arcuate cut out 28 in order to allow the operator to manipulate the pump head 16.

FIGS. 10 and 11 illustrate still a further embodiment of the present invention. As shown in FIG. 10, the handle container 12 is provided with the pump assembly 14, pump head 16 and fluid nozzle 18. In this embodiment, the collar 20 includes a pair of opposed arcuately formed fan supports 44 to which the fan 50 is mounted. The fan 50, in this embodiment, is formed in an articulated manner, so that the fan will fold into a closed position. As illustrated, the fan supports 44 of the collar 20 are arcuately shaped in order to provide an opening for the operator to place their index finger onto the pump head 16 in order to manipulate the pump assembly 14. The fan 50 is shown to be provided with a lock ring 52 which is slidable along the length of the fan 50. As shown in FIG. 10, when the lock ring 52 is in the upper position, this forces the articulated fan blade 50 to be in its closed position. As shown in FIG. 11, when the lock ring 52 slides downward, this allows the articulated fan 50 to open, in order to be in a position for use. As with the other embodiments illustrated hereinabove, the fan 50 is positioned vertically above the pump head 16 and pump assembly 14 thereby allowing the user to cycle the fan back and forth while simultaneously permitting the user to employ their index finger to manipulate the pump assembly 14.

In FIG. 11*a*, the articulated construction of the fan 50 is illustrated. FIG. 11*a* shows the fan blade 50 in its open position, while FIG. 10*a* illustrates the articulated fan in its closed position.

As was indicated previously in conjunction with FIGS. 1-3, the handle carrier 12 may include a manually operated atomizer 29 which may be manually pumped up and down by the user in order to force air into the handle container 12 in order to have atomization of the fluid therein. Manual atomizers of this nature are well known in the art.

The above illustrates a simplified version of a misting fan which eliminates any motors, batteries or other power source, and represents the ultimate in simplicity of a manually operated misting fan. While it has been disclosed what is considered to be the preferred embodiments therein, it will be apparent that various modifications may be made therein in order to achieve the objects and advantages of the present invention.

| | |
|---|---|
| 0 | |
| 1 | |
| 2 | |
| 3 | |
| 4 | |
| 5 | |
| 6 | |
| 7 | |
| 8 | |
| 9 | |
| 10 | fan assembly |
| 11 | |
| 12 | handle container |
| 13 | |
| 14 | pump assembly |
| 15 | |
| 16 | pump head |
| 17 | |
| 18 | fluid nozzle |
| 19 | |
| 20 | collar |
| 21 | |
| 22 | mount flanges |
| 23 | |
| 24 | fan blade |
| 25 | upper end of 24 |
| 26 | lower end of 24 |
| 27 | |
| 28 | arcuate cut-out of 24 |
| 29 | manual atomizer |
| 30 | |
| 31 | circular rim |
| 32 | mount legs |
| 33 | |
| 34 | mount slots |
| 35 | |
| 36 | side supports |
| 37 | |
| 38 | fan blade legs |
| 39 | |
| 40 | |
| 41 | blade support rim |
| 42 | |
| 43 | rivets |
| 44 | fan supports |
| 45 | |
| 46 | |
| 47 | |
| 48 | |
| 49 | |
| 50 | fan |
| 51 | |
| 52 | lock ring |
| 53 | |
| 54 | |
| 55 | |
| 56 | |
| 57 | |
| 58 | |
| 59 | |
| 60 | |
| 61 | |
| 62 | |
| 63 | |
| 64 | |
| 65 | |
| 66 | |
| 67 | |
| 68 | |
| 69 | |
| 70 | |
| 71 | |
| 72 | |

What is claimed is:

1. A non-electric portable manually operated misting fan assembly capable of being manipulated by one hand of the user, comprising,
  a handle for allowing the user to grasp, manipulate and cycle the fan assembly to create a cooling breeze,
  said handle formed by a container adapted to function as a reservoir for supply of fluid and having an upper end and lower end,
  said handle having a pump assembly associated therewith for pumping fluid from the handle reservoir via a push pump head extending upwardly from the upper end of said handle container through a fluid nozzle located in said pump head,
  fan means fixedly mounted on said handle and positioned above said pump head, and
  said fan means bounded by an upper end and lower end, said lower end being arcuately formed over said pump head thereby to allow the user to manipulate said pump head to eject a fluid mist from said handle container through said fluid nozzle while simultaneously allowing the user to cycle the fan means to create the cooling breeze and pump a fluid mist from said handle container.

2. The fan assembly as set forth in claim 1 above, wherein said fan means is mounted on said handle container by mount means interposed between said fan means and said handle container for positionally mounting said fan means adjacent to and above said pump head whereby the user may grasp and manipulate said fan assembly while simultaneously allowing the operation of said pump head to pump a fluid mist from said handle container through said fluid nozzle.

3. The fan assembly as set forth in claim 1 above, wherein said fan means comprises a fan blade having a geometric configuration designed to move a column of air when cycled in a back and forth motion to create the cooling breeze.

4. The fan assembly as set forth in claim 1 above, wherein said fan means is mounted on said handle container vertically above and adjacent to said pump head and spaced there from to allow the user to operate and actuate said pump handle.

5. The fan assembly as set forth in claim 3 above, wherein said fan blade comprises a flat blade dimensionally sized to move a column of air when cycled in a back and forth motion to create the cooling breeze.

6. The fan assembly as set forth in claim 5 above, wherein said fan blade is formed from a semi ridged flexible material to facilitate the movement of a column of air when cycled in a back and forth motion.

7. The fan assembly as set forth in claim 1 above, wherein said fan means comprises a foldable fan means thereby to permit said fan means to be moved and folded between an open operational mode and a folded closed mode.

8. The fan assembly as set forth in claim 2 above, wherein said fan means comprises a fan blade having opposed lower mount legs mounted thereon and extending downwardly therefrom, and said mount means comprises a collar sized to mount on said handle container, said collar including laterally opposed mount flanges adapted to carry said opposed mount legs of said fan blade thereby to mount said fan blade on said handle container when in use, and to remove said fan means from said handle container when not in use.

9. The fan assembly as set forth in claim 2 above wherein said mount means comprises said fan means having a fan structure including a pair of opposed mount legs and said handle container includes a pair of opposed mount slots formed in said handle container, said mount legs being sized and adapted to fit within said mount slots thereby to mount said fan means onto said handle container by inserting said mount legs into said mount slots and position said fan structure above said handle container.

10. The fan assembly as set forth in claim 7 above, wherein said foldable fan means is mounted on said handle container by mount means interposed between said fan means and said handle container for positionally mounting said fan means vertically above said pump head whereby the user may grasp and manipulate said fan assembly to create the cooling breeze while simultaneously allowing the user to actuate and operate said pump head to pump a fluid mist from said handle container through said fluid nozzle.

11. The fan assembly as set forth in claim 10 above, wherein said mount means comprises a collar having a fan bracket mounted thereon and extending upwardly therefrom, said collar being dimensionally sized to surround and mount on said handle container, said foldable fan means being mounted on said fan bracket thereby to be positioned vertically above said pump head allowing access to said pump head by the user.

12. The fan assembly as set forth in claim 11 above, wherein said foldable fan means is formed from a foldable semi-ridged material to allow the fan to be manipulated between an open/use mode and a closed mode.

13. The fan assembly as set forth in claim 12 above, wherein said foldable fan means is further provided with a movable lock ring, said lock ring being movable between a lower fan open position and an upper fan closed position whereby the user may move the lock alternatively between the open fan position and the closed fan position thereby to lock the fan in the closed position.

* * * * *